(12) United States Patent
Toyoda et al.

(10) Patent No.: US 7,879,475 B2
(45) Date of Patent: Feb. 1, 2011

(54) SOLID POLYMER ELECTROLYTE, SOLID POLYMER FUEL CELL AND METHOD FOR MANUFACTURING THE FUEL CELL

(75) Inventors: Eishiro Toyoda, London (GB); Tomohiro Takeshita, Champaign, IL (US); Fusayoshi Miura, Nisshin (JP); Masaya Kawasumi, Anjyo (JP); Naoki Hasegawa, Kasugai (JP); Yu Morimoto, Nagoya (JP); Manabu Kato, Susono (JP); Kazutaka Kimura, Susono (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 1048 days.

(21) Appl. No.: 11/441,103

(22) Filed: May 26, 2006

(65) Prior Publication Data

US 2006/0280985 A1 Dec. 14, 2006

(30) Foreign Application Priority Data

May 31, 2005 (JP) .............................. 2005-159417

(51) Int. Cl.
*H01M 8/10* (2006.01)
(52) U.S. Cl. .............................. 429/33; 429/32; 429/40; 252/500; 521/25; 521/27
(58) Field of Classification Search .................. 429/33, 429/32, 40; 252/500; 521/25, 27
See application file for complete search history.

(56) References Cited

U.S. PATENT DOCUMENTS

| 2002/0093008 A1* | 7/2002 | Kerres et al. ................. 252/500 |
| 2006/0019140 A1* | 1/2006 | Kawazoe et al. ............... 429/33 |
| 2006/0099475 A1* | 5/2006 | Watanabe et al. .............. 429/33 |

FOREIGN PATENT DOCUMENTS

| JP | 2004-18573 | | 1/2004 |
| JP | 2004-018573 | * | 1/2004 |
| WO | WO 2005/020357 A1 | | 3/2005 |

OTHER PUBLICATIONS

Dennis E. Curtin, et al., "Advanced materials for improved PEMFC performance and life", Journal of Power Sources, 131, 2004, pp. 41-48.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

Disclosed herein is a solid polymer electrolyte wherein protons of cation exchange groups contained in a perfluorinated electrolyte are partially replaced by metal ions. The metal ion is at least one metal ion selected from vanadium (V), manganese (Mn), niobium (Nb), tantalum (Ta), chromium (Cr), molybdenum (Mo), tungsten (W), iron (Fe), ruthenium (Ru), nickel (Ni), palladium (Pd), platinum (Pt), silver (Ag), cerium (Ce), neodymium (Nd), praseodymium (Pr), samarium (Sm), cobalt (Co), gadolinium (Gd), terbium (Tb), dysprosium (Dy), holmium (Ho), and erbium (Er) ions. Further disclosed is a solid polymer fuel cell using the solid polymer electrolyte.

7 Claims, 1 Drawing Sheet

SOLID POLYMER ELECTROLYTE, SOLID POLYMER FUEL CELL AND METHOD FOR MANUFACTURING THE FUEL CELL

BACKGROUND OF THE INVENTION

1. Field of the Invention

The present invention relates to a solid polymer electrolyte, a solid polymer fuel cell and a method for manufacturing the solid polymer fuel cell. More specifically, the present invention relates to a solid polymer fuel cell suitable as a power source for automobiles, a small-scale stationary generator, a cogeneration system or the like, a method for manufacturing the solid polymer fuel cell, and a solid polymer electrolyte used in the solid polymer fuel cell.

2. Description of the Related Art

Solid polymer fuel cells include a membrane-electrode assembly (MEA) as a basic unit in which electrodes are bonded to both surfaces of a solid polymer electrolyte membrane. General electrodes for use in solid polymer fuel cells have a bilayer structure consisting of a diffusion layer and a catalyst layer. The diffusion layer is a layer for supplying a reactive gas and electrons to the catalyst layer, and is made of a carbon paper, a carbon cloth, etc. The catalyst layer is a part where an electrode reaction takes place, and is commonly composed of a composite of carbon supporting an electrode catalyst, e.g., platinum, and a solid polymer electrolyte.

As the electrolyte membrane constituting the MEA or the electrolyte in the catalyst layer constituting the MEA, a highly oxidation resistant perfluorinated electrolyte (i.e. an electrolyte including no C—H bond in the polymer chains) is generally used, for example, Nafion (a registered trademark for products manufactured by DuPont), Aciplex (a registered trademark for products manufactured by Asahi Kasei Corporation, Japan), Flemion (a registered trademark for products manufactured by ASAHI GLASS CO., LTD., Japan), etc.

General perfluorinated electrolytes are highly oxidation resistant, but are very expensive. For the purpose of manufacturing solid polymer fuel cells at low costs, the use of hydrocarbon electrolytes (i.e. electrolytes including C—H bonds but no C—F bond in their polymer chains) and partially fluorinated hydrocarbon electrolytes (i.e. electrolytes including both C—H bonds and C—F bonds in their polymer chains) is under consideration.

However, there remain some unsolved problems for commercializing solid polymer fuel cells as power sources for automobiles, etc. For example, hydrocarbon electrolytes are cheaper than perfluorinated electrolytes, but have a disadvantage in that they tend to be deteriorated by peroxide radicals. On the other hand, perfluorinated electrolytes are highly oxidation resistant when compared to hydrocarbon electrolytes. However, perfluorinated electrolytes have problems that they are gradually deteriorated by peroxide radicals under extreme conditions such as the fuel cell. As a result, $F^-$ (fluoride ions) are dissolved therefrom (see, "Non-patent Publication 1").

Various proposals have been made to solve the above problems.

For example, Patent Publication 1 discloses a proton-conducting polymer membrane in which hydrogen atoms of sulfonic acid groups contained in a sulfonated polyphenylenesulfide membrane are partially replaced by Mg, Ca, Al or La. Patent Publication 1 also describes that the partial replacement of hydrogen atoms of sulfonic acid groups with a metal, e.g., Mg, causes a deterioration in the proton conductivity of the membrane but improves the oxidation resistance of the membrane.

[Patent Publication 1] Japanese Patent Unexamined Publication No. 2004-018573

[Non-patent Publication 1] D. E. Curtin et al., Journal of Power Science 131 (2004) 41-48

However, to attain high oxidation resistance of the proton-conducting polymer membrane disclosed in Patent Publication 1, it is necessary to add large amounts of metal ions. As a result, the electrical conductivity of the membrane drops considerably. On the other hand, when small amounts of metal ions are added to increase the electrical conductivity of the membrane, high durability of the membrane cannot be achieved.

Hydrocarbon electrolytes include C—H bonds in their polymer chains. Although protons of proton-conducting substituents contained in hydrocarbon electrolytes are partially replaced by metal ions to protect the proton-conducting substituents, the other parts of the electrolytes are inevitably deteriorated by peroxide radicals. For this reason, although the proton-conducting polymer electrolyte membrane disclosed in Patent Publication 1 is practically applied to solid polymer fuel cells, sufficiently high durability of the solid polymer fuel cells is not attainable.

SUMMARY OF THE INVENTION

One object to be achieved by the present invention is to provide a solid polymer electrolyte with high electrical conductivity and high durability. Another object to be achieved by the present invention is to provide a solid polymer electrolyte which shows high durability even under extreme conditions such as a fuel cell. Still another object to be achieved by the present invention is to provide a solid polymer fuel cell using these solid polymer electrolytes.

In accordance with one aspect of the present invention for achieving the above objects, there is provided a solid polymer electrolyte including a perfluorinated electrolyte having cation exchange groups; and metal ions partially replacing protons of the cation exchange groups; wherein the metal ion is at least one metal ion selected from vanadium (V), manganese (Mn), niobium (Nb), tantalum (Ta), chromium (Cr), molybdenum (Mo), tungsten (W), iron (Fe), ruthenium (Ru), nickel (Ni), palladium (Pd), platinum (Pt), silver (Ag), cerium (Ce), neodymium (Nd), praseodymium (Pr), samarium (Sm), cobalt (Co), gadolinium (Gd), terbium (Tb), dysprosium (Dy), holmium (Ho), and erbium (Er) ions.

In accordance with another aspect of the present invention, there is provided a solid polymer fuel cell using the solid polymer electrolyte of the present invention.

In accordance with yet another aspect of the present invention, there is provided a method for manufacturing a solid polymer fuel cell, the method including the steps of partially replacing protons of cation exchange groups contained in a perfluorinated electrolyte with metal ions; and fabricating a unit cell using the perfluorinated electrolyte.

When protons of cation exchange groups contained in a perfluorinated electrolyte are partially replaced by particular metal ions, both high electrical conductivity and high durability can be achieved. Since the solid polymer electrolyte of the present invention includes a perfluorinated electrolyte as foundation, it exhibits high durability when applied to a fuel cell in comparison with conventional electrolytes.

DETAILED DESCRIPTION OF THE INVENTION

Figure 1:
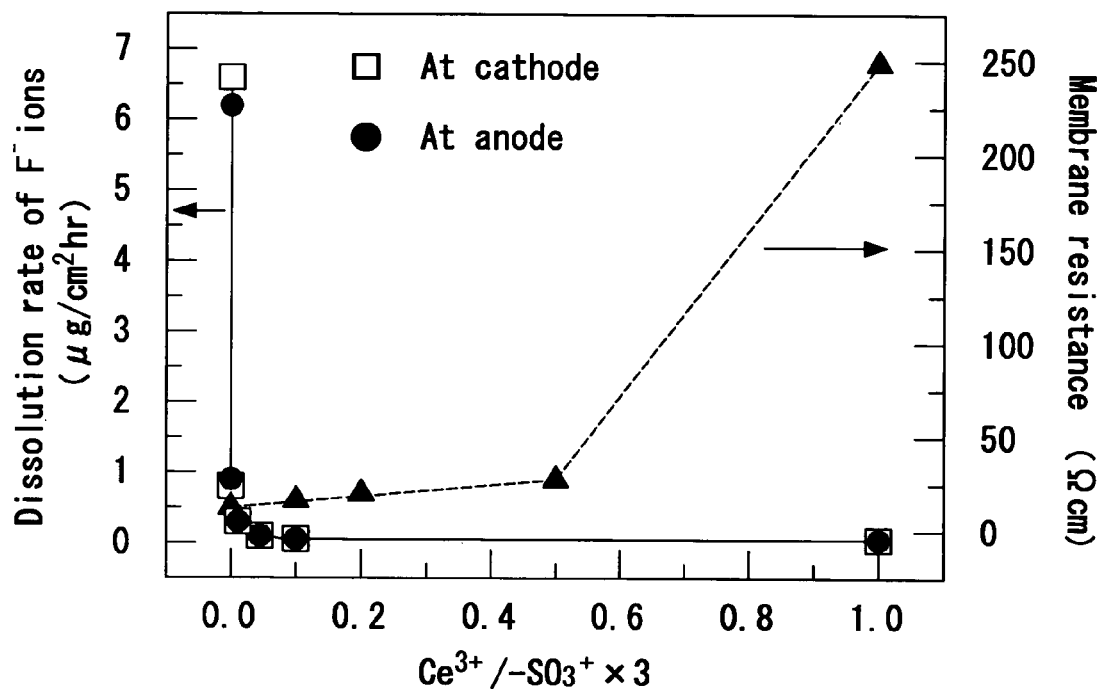
FIG. 1 is a graph showing the relationship between ion exchange rate with $Ce^{3+}$ ions and, dissolution rate of $F^-$ ions and membrane resistance.

Hereinafter, a detailed description will be made of an embodiment of the present invention. The present invention provides a solid polymer electrolyte including a perfluorinated electrolyte having cation exchange groups; and metal ions partially replacing protons of the cation exchange groups.

By use of the term "perfluorinated electrolyte" herein is meant a solid polymer electrolyte in which C—F bonds are included but no C—H bond is included in their polymer chains. The perfluorinated electrolyte may have fluorocarbon structure (—CF$_2$—, —CFCl—), chlorocarbon structure (—CCl$_2$—), and other moieties (for example, —O—, —S—, —C(=O)—, —N(R)— ("R"=alkyl)). The perfluorinated electrolyte is not especially restricted in molecular structure, and may have a straight-chained structure or a branched structure, and further, may have a cyclic structure.

The kind of cation exchange groups contained in the perfluorinated electrolyte is not particularly limited. Examples of suitable cation exchange groups include sulfonic acid, carboxylic acid, phosphonic acid, and sulfonimide groups. One or more kinds of the cation exchange groups may be contained in the perfluorinated electrolyte. The cation exchange groups may be directly bonded to the straight-chained polymer chains or may be bonded to either main chain or side chains of the branched-polymer chains.

Of these, since a perfluorinated electrolyte (perfluorocarbon sulfonic acid) containing sulfonic acid groups as cation exchange groups is highly durable and exhibits high proton conductivity, it is particularly suitable as a constituent material of the solid polymer electrolyte of the present invention.

Specific examples of perfluorinated electrolytes include Nafion (a registered trademark for products manufactured by DuPont), Aciplex (a registered trademark for products manufactured by Asahi Kasei Corporation, Japan), Flemion (a registered trademark for products manufactured by ASAHI GLASS CO., LTD., Japan), and derivatives thereof.

The amount of the cation exchange groups contained in the perfluorinated electrolyte is not especially limited, and may be properly selected according to the applications of the solid polymer electrolyte and the characteristics required for the solid polymer electrolyte. Generally, as the amount of cation exchange groups in a solid polymer electrolyte increases, the electrical conductivity of the solid polymer electrolyte becomes high. However, if the solid polymer electrolyte contains too large an amount of cation exchange groups, it is readily dissolved in water or swollen.

When protons of the cation exchange groups contained in the solid polymer electrolyte are partially replaced by metal ions, the cation exchange groups are ionically crosslinked by the metal ions. Accordingly, even in the case where the amount of cation exchange groups is more than that of the conventional electrolytes, the solid polymer electrolyte is not readily dissolved in water or swollen, unlike conventional electrolytes.

Specific examples of preferred metal ions that can partially replace protons of the cation exchange groups include vanadium (V), manganese (Mn), niobium (Nb), tantalum (Ta), chromium (Cr), molybdenum (Mo), tungsten (W), iron (Fe), ruthenium (Ru), nickel (Ni), palladium (Pd), platinum (Pt), silver (Ag), cerium (Ce), neodymium (Nd), praseodymium (Pr), samarium (Sm), cobalt (Co), gadolinium (Gd), terbium (Tb), dysprosium (Dy), holmium (Ho), and erbium (Er) ion. The protons of the cation exchange groups may be replaced by one or more kinds of the metal ions. In addition, it is preferred that the protons of the cation exchange groups be previously (i.e. before use) replaced by one kind of the metal ions.

Of these metal ions, cerium (Ce) ions are particularly preferred as metal ions that replace the protons of the cation exchange groups because they can simultaneously achieve high electrical conductivity and superior oxidation resistance.

The presence of slight amounts of transition metal ions causes a deterioration in the durability of an electrolyte, but transition metal ions (particularly, Fe ions) present in an electrolyte function to improve the durability of the electrolyte.

The rate of the metal ions that exchange with the protons of the cation exchange groups (hereinafter, referred to as an "ion exchange rate") can be represented by Formula (1) below:

Ion exchange rate=(number of moles of the metal ions×valence of the metal ions/total number of moles of the cation exchange groups contained in the perfluorinated electrolyte)×100     (1)

Generally, as the ion exchange rate is high, the oxidation resistance is improved but the electrical conductivity is poor. The optimum ion exchange rate is determined depending on the kind of the metal ions.

For high oxidation resistance, the solid polymer electrolyte preferably has an ion exchange rate of 0.01% or above.

For example, in the case where the perfluorinated electrolyte is a perfluorocarbon sulfonic acid membrane (thickness: 45 μm) with 1,000-1,200 g/equiv., and the metal ions are $Ce^{3+}$, when the ion exchange rate is 0.01% or higher, then the dissolution rates of fluorine ions are 1.0 μg/(cm$^2$·hr) or less at both a cathode and an anode.

Further, in the case where the perfluorinated electrolyte is a perfluorocarbon sulfonic acid membrane (thickness: 45 μm) with 1,000-1,200 g/equiv., and the metal ions are $Ce^{3+}$, when the ion exchange rate is 0.5% or higher, then the dissolution rates of fluorine ions are 0.5 μg/(cm$^2$·hr) or less at both a cathode and an anode.

The "dissolution rate of fluorine ions" is the amount of $F^-$ ions dissolved in the aqueous solution per unit time and unit area, obtained after following procedures: dipping an electrolyte membrane (size: 7 cm×7 cm) in 200 ml of an aqueous solution containing a hydrogen peroxide (1 wt %) and $Fe^{2+}$ ions (10 ppm); and then maintaining the solution at 100° C. for 8 hours.

Further, in the case where the perfluorinated electrolyte is a perfluorocarbon sulfonic acid membrane (thickness: 45 μm) with 1,000-1,200 g/equiv., and the metal ions are $Fe^{2+}$, when the ion exchange rate is 0.2% or higher, then the dissolution rates of fluorine ions are about 0.05 μg/(cm$^2$·hr) or less at both a cathode and an anode.

To achieve high electrical conductivity, the solid polymer electrolyte preferably has an ion exchange rate of 60% or below.

For example, in the case where the perfluorinated polymer electrolyte is a perfluorocarbon sulfonic acid membrane (thickness: 45 μm) with 1,000-1,200 g/equiv., and the metal ions are $Ce^{3+}$, when the ion exchange rate is 60% or lower, then the membrane resistance is not higher than 75 Ωcm.

Further, in the case where the perfluorinated polymer electrolyte is a perfluorocarbon sulfonic acid membrane (thickness: 45 μm) with 1,000-1,200 g/equiv., and the metal ions are $Ce^{3+}$, when the ion exchange rate is 50% or lower, then the membrane resistance is not higher than 30 Ωcm.

Further, in the case where the perfluorinated polymer electrolyte is a perfluorocarbon sulfonic acid membrane (thickness: 45 μm) with 1,000-1,200 g/equiv., and the metal ions are $Ce^{3+}$, when the ion exchange rate is 20% or lower, the membrane resistance is not higher than 25 Ωcm.

The use of the term "membrane resistance" herein means an alternating current resistance in a planar direction of the solid polymer electrolyte in water.

The solid polymer electrolyte of the present invention is prepared by dipping a perfluorinated polymer electrolyte in an aqueous solution containing a water-soluble metal salt; and maintaining the solution at a particular temperature for a given time. The solid polymer electrolyte thus prepared has a structure wherein protons of cation exchange groups contained in the perfluorinated polymer electrolyte are partially replaced by the metal ions.

At this time, the kind of the metal salt is not especially limited so long as it is soluble in water. Specifically, examples of preferred metal salts include nitrates, chlorides and sulfates of metals. The amount of the metal salt dissolved in the aqueous solution is optimally selected depending on the required ion exchange rate.

There is no particular limitation on the temperature and time for the ion exchange. Generally, the higher the temperature of the aqueous solution containing the metal salt is, the higher the ion exchange rate is. To efficiently perform the ion exchange, the temperature of the aqueous solution is preferably adjusted to room temperature or above, more preferably 50° C. or above, and even more preferably 80° C. or above.

The dipping time in the aqueous solution is optimally determined according to the temperature of the aqueous solution so that the ion exchange occurs sufficiently. The dipping time is commonly from about one hour to about several tens of hours.

Hereinafter, a solid polymer fuel cell of the present invention will be described. Generally, the solid polymer fuel cell includes a membrane-electrode assembly (MEA), in which electrodes are bonded to both surfaces of an electrolyte membrane. The solid polymer fuel cell is manufactured by holding the MEA between separators formed with gas flow paths to produce a plurality of unit cell and laminating the unit cells.

The constituent electrolyte membrane of the MEA may be made of a solid polymer electrolyte alone or a composite with a reinforcement, e.g., a porous material, a long-fiber material or a short-fiber material.

The constituent electrodes of the MEA have a bilayer structure consisting of a catalyst layer and a diffusion layer. The electrodes may be composed of a catalyst layer only. In the case where the electrodes have a bilayer structure, the electrodes are bonded to the electrolyte membrane via the catalyst layer.

The catalyst layer is a part where an electrode reaction takes place. The catalyst layer is composed of an electrode catalyst or a support supporting an electrode catalyst, and an electrolyte in the catalyst layer. The electrolyte in the catalyst layer coats the electrode catalyst or the support. Generally, an optimum electrode catalyst is used according to the intended purposes of and conditions of use of the MEA. As the electrode catalyst of the solid polymer fuel cell, platinum, a platinum alloy, palladium, ruthenium, rhodium or an alloy thereof is used. The amount of the electrode catalyst in the catalyst layer is optimally selected according to the applications of the MEA and conditions of use of the MEA.

The catalyst support serves to support the particulate electrode catalyst and to give and receive electrons at the catalyst layer. As suitable catalyst support, carbon, activated charcoal, fullerene, carbon nanohorns, carbon nanotubes, and the like are commonly used. The amount of the electrode catalyst supported on the surface of the catalyst support is optimally selected according to various factors, including the materials for the electrode catalyst and the catalyst support, the applications of the MEA, and the conditions of use of the MEA.

The electrolyte in the catalyst layer acts to give and receive protons between the solid polymer electrolyte membrane and the electrodes. In general, materials for the electrolyte in the catalyst layer may be identical to those of the solid polymer electrolyte membrane. However, the material may be different from those of the solid polymer electrolyte membrane. The amount of the electrolyte in the catalyst layer is optimally selected according to the applications of the MEA and conditions of use of the MEA.

The diffusion layer acts to give and receive electrons to and from the catalyst layer, and to supply a reactive gas to the catalyst layer. The diffusion layer is commonly made of a carbon paper, a carbon cloth, etc. For high water-repellency, the diffusion layer may be made of a carbon paper coated with a mixture (a water-repellent layer) of a water-repellent polymer powder, such as polytetrafluoroethylene, and a carbon powder.

The solid polymer fuel cell of the present invention is characterized by the use of the solid polymer electrolyte of the present invention as the electrolyte membrane of the MEA or the electrolyte in the catalyst layer of the MEA. In this case, the MEA may be composed of the solid polymer electrolyte of the present invention only or a combination with another solid polymer electrolyte.

With the use of the above method, by partially replacing protons of cation exchange groups contained in a perfluorinated electrolyte with metal ions, then the solid polymer electrolyte is prepared. By using the obtained solid polymer electrolyte, a unit cell is fabricated. By laminating a plurality of the unit cells, the solid polymer fuel cell of the present invention is manufactured.

The operation and effects of the solid polymer electrolyte of the present invention will be described below.

Hydrogen peroxide is formed due to side electrode reactions and decomposed in a fuel cell to form hydrogen peroxide radicals. The hydrogen peroxide radicals attack an electrolyte present in the fuel cell to deteriorate the electrolyte. The detailed mechanism for the deterioration process of the perfluorinated electrolyte by the hydrogen peroxide radicals is not clearly established. However, it is believed that a main cause of the deterioration is because the hydrogen peroxide radicals attack "hydrogen-containing end groups" present in the polymer.

The perfluorinated electrolyte contains a small amount of highly active end groups formed during its synthetic processes. It is known that the presence of the highly active end groups is responsible for the deterioration. For example, where $CF_2X$ (X=COOH) is present at the terminals of the polymer, it is estimated that the deterioration occurs due to the following reactions (see, Non-patent Publication 1).

First, hydrogen is separated from the terminal acid group to form a perfluorocarbon radical ($R_f$—$CF_2$·), carbon dioxide and water (Step 1, see Formula (2)). The perfluorocarbon radical ($R_f$—$CF_2$·) reacts with a hydroxyl radical to form an intermediate ($R_f$—$CF_2OH$), after which the intermediate becomes an acid fluoride ($R_f$—COF) and one equivalent of hydrogen fluoride (Step 2, see Formula (3)). The acid fluoride ($R_f$—COF) is hydrolyzed to form one equivalent of hydrogen fluoride and another terminal acid group (Step 3, see Formula (4)).

$$R_f-CF_2COOH + \cdot OH \rightarrow R_f-CF_2\cdot + CO_2 + H_2O \quad (2)$$

$$R_f-CF_2\cdot + \cdot OH \rightarrow R_f-CF_2OH \rightarrow R_f-COF + HF \quad (3)$$

$$R_f-COF + H_2O \rightarrow R_f-COOH + HF \quad (4)$$

Partial replacement of protons of the cation exchange groups with metal ions contained in the perfluorinated electrolyte leads to inhibition of deterioration by hydrogen peroxide radicals.

Although detailed reasons for the inhibition are not known, it is believed due to one of the following facts:

(1) Protons of the cation exchange groups, which are kinds of "hydrogen-containing end groups", are partially replaced by metal ions, and as a result, the cation exchange groups are inactivated with respect to hydrogen peroxide radicals; or (2) The reaction $H_2O_2 \rightarrow H_2O + O_2$ or $\cdot OH \rightarrow H_2O + O_2$ is accelerated, so that unstable active species are decomposed before attack of the electrolyte.

The use of the particular metal ions to replace the protons, although the detailed mechanism is not obvious, can improve the oxidation resistance of the electrolyte while maintaining high electrical conductivity (low membrane resistance) of the electrolyte. The application of the electrolyte to a fuel cell allows the fuel cell to have high output and high durability.

EXAMPLES

Examples 1 to 5

An appropriate amount of cerium nitrate ($Ce(NO_3)_3 \cdot 6H_2O$) was dissolved in 100 ml of water, and then perfluorinated electrolyte membrane (Nafion (a registered trademark) 112) having a thickness of 45 μm and a size of 7 cm×7 cm was placed in the solution. The solution was heated to 90° C. for 1 hour. Thereafter, the resulting electrolyte membrane was cleaned twice with 100 ml of hot pure water at 90° C. for 30 minutes. Further, the resulting electrolyte membrane was cleaned several times with ion exchange water, and dried under vacuum at 80° C. for 2 hours. Thereafter, the weight $E_1$ was measured. The ion exchange rate with $Ce^{3+}$ in the treated membranes was measured by titration (0.005 N NaOH) for cation exchange capacity.

Subsequently, 200 ml of an aqueous solution containing a hydrogen peroxide (1 wt %) and Fe (10 ppm), which was added in the form of ferrous chloride ($FeCl_2$), was prepared. The aqueous solution and the treated membrane were added to a container of a polytetrafluoroethylene inner barrel. Then, a dipping test was conducted at 100° C. for 8 hours. After completion of the dipping test, the concentration of $F^-$ ions dissolved was examined using an ion-selective electrode (a product manufactured by Orion, USA). The membrane was cleaned with an ion exchange water, and dried under vacuum at 80° C. for 2 hours. Thereafter, the weight $E_2$ was measured. The measured weights $E_1$ and $E_2$ were used to calculate changes in weight ($\Delta W$) by Formula (5) below:

$$\Delta W = \{(E_1 - E_2)/E_1\} \times 100 \quad (5)$$

Comparative Examples 1 to 3

The procedure of Examples 1 to 5 was repeated except that lanthanum nitrate ($La(NO_3)_3$) was used instead of cerium nitrate, to produce electrolyte membrane (Comparative Examples 1 and 2) in which protons of the cation exchange groups were partially replaced by $La^{3+}$. Under the same conditions as those employed in Examples 1 to 5, the amount of $F^-$ ion dissolved was measured and the change in weight ($\Delta W$) before and after the dipping test was calculated in the electrolyte membrane (Comparative Examples 1 and 2) and a non-treated perfluorinated polymer electrolyte (Comparative Example 3).

Table 1 shows the concentrations of $F^-$ ions and the changes in weight ($\Delta W$). As can be seen from the data shown in Table 1, the membranes (Examples 1 to 5) ion-exchanged with $Ce^{3+}$ showed a small decrease in weight and inhibited dissolution of $F^-$ ions, compared to the non-treated membrane (Comparative Example 3). Further, the membranes (Examples 1 and 3) ion-exchanged with $Ce^{3+}$ showed a small decrease in weight and inhibited dissolution of $F^-$ ions, compared to the membranes ion-exchanged with $La^{3+}$ (Comparative Examples 1 and 2) in an amount substantially equal to that of $Ce^{3+}$ in the membranes of Examples 1 and 3.

TABLE 1

| | Ion | Ion exchange rate (%) | $F^-$ (ppm) | $\Delta W$ (wt %) |
|---|---|---|---|---|
| Example 1 | Ce | 1.2 | 11.3 | −1.2 |
| Example 2 | Ce | 4.9 | 4.6 | −0.5 |
| Example 3 | Ce | 9.5 | 1.9 | 0.0 |
| Example 4 | Ce | 20.1 | 1.0 | +0.5 |
| Example 5 | Ce | 50.2 | 0.7 | +1.6 |
| Comparative Example 1 | La | 1.1 | 26.0 | −2.0 |
| Comparative Example 2 | La | 10.1 | 7.0 | −0.7 |
| Comparative Example 3 | H | 0.0 | 27.9 | −4.1 |

Examples 6 to 18

The procedure of Examples 1 to 5 was repeated to produce membrane in which 10% of protons of the cation exchange groups were ion-exchanged with various metal ions. The amount of $F^-$ ions dissolved was measured in the membrane under the same conditions as those employed in Examples 1 to 5.

The chemicals used for the ion exchange and the amounts of $F^-$ ions dissolved are shown in Table 2. The membranes ion-exchanged with the metal ions shown in Table 2 inhibited discharge of fluorine ions, compared to the membrane (Comparative Example 2) replaced by $La^{3+}$ at an ion exchange rate of 10%.

TABLE 2

| | Ion | Reagent | F (ppm) |
|---|---|---|---|
| Example 6 | Cr | $Cr(NO_3)_3 \cdot 9H_2O$ | 3.9 |
| Example 7 | Tb | $Tb(NO_3)_3 \cdot 6H_2O$ | 4.5 |
| Example 8 | Gd | $Gd(NO_3)_3 \cdot 6H_2O$ | 4.6 |
| Example 9 | Sm | $Sm(NO_3)_3 \cdot 6H_2O$ | 4.8 |
| Example 10 | Dy | $Dy(NO_3)_3 \cdot 6H_2O$ | 2.8 |
| Example 11 | Ho | $Ho(NO_3)_3 \cdot 5H_2O$ | 3.1 |
| Example 12 | Er | $Er(NO_3)_3 \cdot 6H_2O$ | 3.5 |
| Example 13 | Ag | $AgNO_3$ | 4.3 |
| Example 14 | Co | $Co(NO_3)_3 \cdot 6H_2O$ | 4.9 |
| Example 15 | Hf | $HfCl_4$ | 5.0 |
| Example 16 | Ru | $RuCl_3 \cdot nH_2O$ | 2.0 |
| Example 17 | Pd | Aqueous $PdCl_2$ solution | 3.0 |
| Example 18 | Pt | Aqueous $[Pt(NH_3)_4]Cl_2 \cdot H_2O$ solution | 3.5 |

Example 19

The dry weight of a membrane (EW: 1100, 6 cm×6 cm, Nafion (a registered trademark for products manufactured by DuPont) 112) was measured, and the total number of moles of sulfonic acid groups in the membrane was calculated. Assuming that one $Ce^{3+}$ ion exchanges with three sulfonic acid groups, the number of moles of $Ce^{3+}$ ions corresponding to 10% of the total number of sulfonic acid groups was calculated.

The membrane was dipped in an aqueous cerium nitrate solution containing $Ce^{3+}$ ions corresponding to the calculated number of moles, and allowed to stand at room temperature for 24 hours. After completion of the ion exchange, the membrane was washed with hot water at 60° C.

Catalyst layers were transferred to both surfaces of the resulting membrane using a hot press to obtain an MEA.

Comparative Example 4

The procedure of Example 19 was repeated except that lanthanum nitrate was used instead of cerium nitrate, to produce an electrolyte membrane in which protons corresponding to 10% of the total number of sulfonic acid groups were ion-exchanged with $La^{3+}$. Catalyst layers were transferred to both surfaces of the resulting membrane using a hot press to obtain an MEA.

Comparative Example 5

An MEA was obtained in the same manner as in Example 19, except that an electrolyte membrane Nafion (a registered trademark for products manufactured by DuPont) 112 was used without any ion exchange with metal ions.

Each of the MEAs produced in Example 19 and Comparative Examples 4 and 5 was used to manufacture fuel cells. Each of the fuel cells was operated under open-circuit conditions. Pure hydrogen was fed at a flow rate of 500 ml/minutes into an anode under a pressure of 1 ata, and air was fed at a flow rate of 500 ml/minutes into a cathode under a pressure of 1 ata. After operation for 48 hours, water discharged from the fuel cell was collected. The concentration of $F^-$ ions in the water was measured using an ion-selective electrode (manufactured by Orion, USA). In addition, the dissolution rate of $F^-$ ions per unit area and unit time was calculated from the amount of $F^-$ ions dissolved.

In the case of the MEA produced using the non-treated membrane in Comparative Example 5, the dissolution rates of $F^-$ ions were 6.53 ($\mu g/(cm^2 \cdot hr)$) and 6.19 ($\mu g/(cm^2 \cdot hr)$) at the cathode and anode, respectively. In the case of the MEA produced using the membrane ion-exchanged with $La^{3+}$ in Comparative Example 4, the dissolution rates of $F^-$ ions were 0.24 ($\mu g/(cm^2 \cdot hr)$) and 0.11 ($\mu g/(cm^2 \cdot hr)$) at the cathode and anode, respectively. The dissolution rates of $F^-$ ions in Comparative Example 4 were lower than those of $F^-$ ions in the non-treated membrane.

In contrast, in the case of the MEA produced using the membrane ion-exchanged with $Ce^{3+}$ in Example 19, the dissolution rates of $F^-$ ions were 0.03 ($\mu g/(cm^2 \cdot hr)$) and 0.03 ($\mu g/(cm^2 \cdot hr)$) at the cathode and anode, respectively. The dissolution rates of $F^-$ ions in Example 19 were further lower than those of $F^-$ ions in the membrane ion-exchanged with $La^{3+}$. From these results, it could be confirmed that $Ce^{3+}$ ions had superior inhibitory effects against the deterioration of the membranes when compared to $La^{3+}$ ions.

Example 20

A membrane having an ion exchange rate with $Ce^{3+}$ of 0 to 100% was produced in the same manner as in Example 19. The membrane alternating current resistance (membrane resistance) of the membrane was measured.

Catalyst layers were transferred to both surfaces of the membrane using a hot press to obtain an MEA. A fuel cell was manufactured using the MEA. The dissolution rates of $F^-$ ions at the cathode and anode were measured under the same conditions as those employed in Example 19.

FIG. 1 shows the relationship of ion exchange rate, dissolution rate of $F^-$ ions and membrane resistance. In FIG. 1, symbols "□" denote dissolution rates of $F^-$ ions at the cathode, and symbols "●" denote dissolution rates of $F^-$ ions at the anode.

As shown in FIG. 1, when the ion exchange rate was 0%, the dissolution rates of $F^-$ ions exceeded 6 $\mu g/(cm^2 \cdot hr)$ at both cathode and anode. In contrast, when the ion exchange rate with $Ce^{3+}$ was 0.01% or above, the dissolution rates of $F^-$ ions were 1 $\mu g/(cm^2 \cdot hr)$ or less at both cathode and anode. Meanwhile, when the ion exchange rate with $Ce^{3+}$ exceeded 50%, the membrane resistance was drastically increased. The results of FIG. 1 demonstrate that when the ion exchange rate with $Ce^{3+}$ ions is in the range of 0.01 to 60% (preferably 0.01 to 50%), low membrane resistance (i.e. high electrical conductivity) and high durability can be simultaneously achieved.

Example 21

Catalyst layers were bonded to both surfaces of a perfluorinated electrolyte (Nafion (a registered trademark) 112, EW1100) to obtain an MEA (423 mg). $FeCl_2 \cdot 4H_2O$ corresponding to a desired ion exchange rate was weighed and dissolved in 100 mL of water. The MEA was dipped in the aqueous $FeCl_2$ solution (23° C.) for 18 hours to partially replace protons of the cation exchange groups ($-SO_3H$) by $Fe^{2+}$. After the passage of a specified time, the MEA was taken out of the aqueous solution and cleaned with ultrapure water several times. The clean MEA was dried in an oven at 50° C. for 1 to 2 hours.

The ion exchange rates were adjusted to 0.2%, 30%, 40% and 60%, i.e., four kinds, by varying the amount of $FeCl_2$ dissolved in the aqueous $FeCl_2$ solution. The ion exchange rates were confirmed by dipping an MEA ion-exchanged under the same conditions in a 20% aqueous nitric acid solution to extract Fe ions at 60° C. over 24 hours, and measuring the content of the Fe ions in the extracted solution.

Comparative Example 6

An MEA was produced under the same conditions employed in Example 21, except that no ion exchange treatment with an aqueous $FeCl_2$ solution was done.

Electricity generation tests were conducted using the MEAs produced in Example 21 and Comparative Example 6. The tests were conducted using a fuel cell evaluation device under the following conditions.

Figure 2:
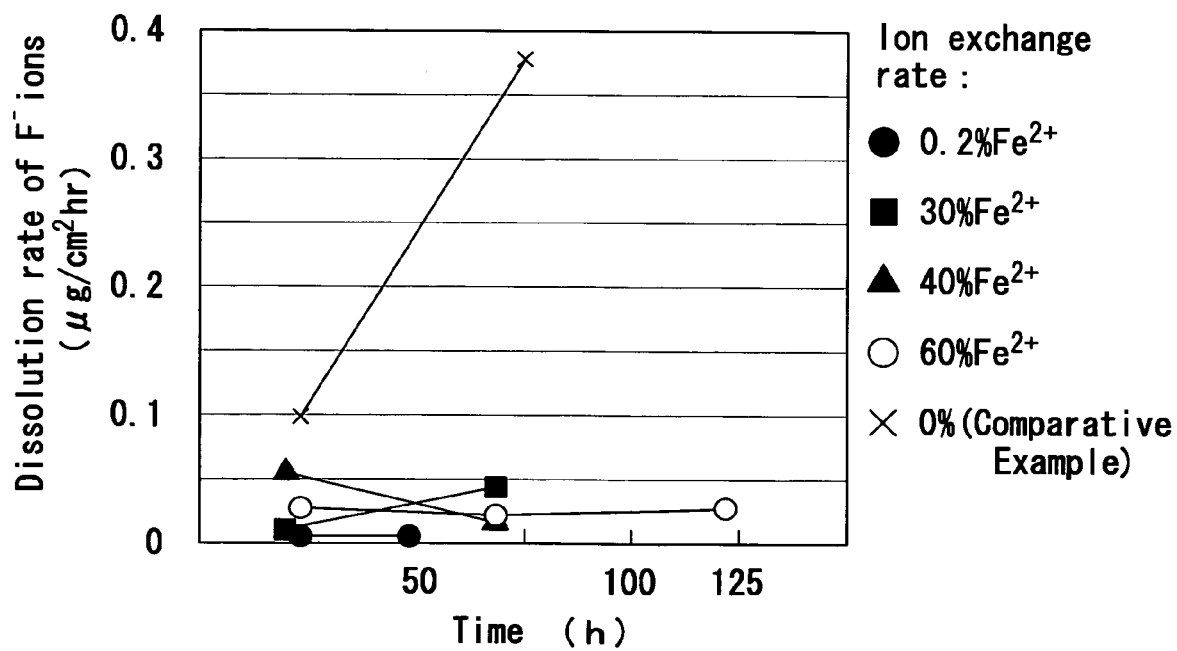
FIG. 2 is a graph showing changes in the dissolution rate of $F^-$ ions discharged from solid polymer fuel cells using various electrolyte membranes having different ion exchange rates with $Fe^{2+}$ ions, with the passage of time.

Conditions at anode: pure hydrogen, pressure: 0.1 ata
Conditions at cathode: air, pressure: 0.05 ata
Cell temperature: 80° C.
Temperature of humidifier: 80° C./45° C. (cathode/anode)
Current density: 0.1 $A/cm^2$ After operation for a specified time, water discharged from each of the fuel cells was collected. The concentration of $F^-$ ions in the water was measured using an ion-selective electrode (manufactured by Orion, USA). In addition, the dissolution rate of $F^-$ ions was calculated from the amount of $F^-$ ions dissolved. The use of the term "dissolution rate of $F^-$ ions" herein means the amount ($\mu g/(cm^2 \cdot hr)$) of $F^-$ ions dissolved in water per unit area and unit time under the above-mentioned conditions. FIG. 2 shows changes in the dissolution rate of $F^-$ ions over time. FIG. 2 shows that the dissolution of $F^-$ ions was considerably inhibited at an ion exchange rate with $Fe^{2+}$ ions ranging from 0.2% to 60%.

Example 22

The procedure of Example 19 was repeated to produce electrolyte membranes ion-exchanged at a rate of 10% with $Fe^{2+}$ and $Fe^{3+}$ from iron sulfate (II) and iron nitrate (III), respectively. The dissolution rates of $F^-$ ions in the membranes were calculated. As a result, the dissolution rates of $F^-$ ions in the membrane ion-exchanged with $Fe^{2+}$ ions were 0.03 (μg/(cm²·hr)) and 0.05 (μg/(cm²·hr)) at the cathode and the anode, respectively. In addition, the dissolution rates of $F^-$ ions in the membrane ion-exchanged with $Fe^{3+}$ ions were 0.03 (μg/(cm²·hr)) and 0.03 (μg/(cm²·hr)) at the cathode and the anode, respectively. These membranes showed inhibitory effects against deterioration.

Example 23

The weight of an electrolyte solution (manufactured by DuPont, DE2020, EW:1100) containing 20 wt % of an electrolyte (Nafion (a registered trademark)) was measured, and the number of moles of $Ce^{3+}$ ions corresponding to 10% of sulfonic acid groups was calculated from the amount of the electrolyte contained in the electrolyte solution. Cerium nitrate containing the same number of moles of the $Ce^{3+}$ ions was added to the electrolyte solution and allowed to stand at room temperature for 24 hours. The ion-exchanged electrolyte solution, a platinum-supported carbon, water, ethanol and propylene glycol were used to prepare a catalyst ink. Thereafter, the catalyst ink was formed into sheets, and the sheets were transferred to an electrolyte membrane (Nafion (a registered trademark) 112) using a hot press to obtain an MEA. The dissolution rates of $F^-$ ions were measured using the MEA in the same manner as in Example 19. As a result, the dissolution rates of $F^-$ ions were 0.02 (μg/(cm²·hr)) and 0.04 (μg/(cm²·hr)) at the cathode and the anode, respectively. It was indicated that the electrolyte in the catalyst layers, which was ion-exchanged, also showed inhibitory effects against deterioration.

Example 24

A catalyst layer was prepared using a 10% ion-exchanged electrolyte solution in the same manner as in Example 23, except that iron nitrate was used instead cerium nitrate. An MEA was produced using the catalyst layer in the same manner as in Example 23. The dissolution rates of $F^-$ ions were measured using the MEA in the same manner as in Example 23. As a result, the dissolution rates of $F^-$ ions were 0.01 (μg/(cm²·hr)) and 0.03 (μg/(cm²·hr)) at the cathode and the anode, respectively. Inhibitory effects against deterioration were indicated.

The present invention has been described herein with reference to its preferred embodiments. These embodiments do not serve to limit the invention, and various modifications and changes can be made without departing from the spirit of the invention.

For example, the greatest effects of the present invention can be attained when the present invention is applied to perfluorinated electrolytes, but the present invention can be applied to hydrocarbon electrolytes and partially fluorinated hydrocarbon electrolytes.

INDUSTRIAL APPLICABILITY

The solid polymer electrolyte fuel cell of the present invention can be applied to power sources for automobiles, small-scale stationary generators, cogeneration systems, and the like. In addition, the applications of the solid polymer electrolyte of the present invention are not limited to electrolyte membranes of solid polymer fuel cells and electrolytes in the catalyst layers thereof, and include electrolyte membranes, electrode materials, etc. for use in a variety of electrochemical devices, such as water electrolyzers, hydrohalogenic acid electrolyzers, sodium chloride electrolyzers, oxygen and/or hydrogen concentrators, humidity sensors and gas sensors.

What is claimed is:

1. A solid polymer electrolyte, comprising:
a perfluorinated electrolyte having cation exchange groups, and
metal ions partially replacing protons of the cation exchange groups, wherein the solid polymer electrolyte has an ion exchange rate with the metal ions of 0.01 to 60%, as represented by Formula (1) below:

Ion exchange rate=((number of moles of the metal ions×valence of the metal ions)/total number of moles of the cation exchange groups contained in the perfluorinated electrolyte)×100     (1), wherein the metal ion is at least one metal ion selected from the group consisting of vanadium (V), niobium (Nb), tantalum (Ta), chromium (Cr), molybdenum (Mo), tungsten (W), iron (Fe), ruthenium (Ru), nickel (Ni), palladium (Pd), platinum (Pt), neodymium (Nd), praseodymium (Pr), samarium (Sm), cobalt (Co), gadolinium (Gd), terbium (Tb), dysprosium (Dy), holmium (Ho), and erbium (Er) ions.

2. The solid polymer electrolyte according to claim 1, wherein the solid polymer electrolyte has a membrane resistance of 30 Ωcm or less.

3. The solid polymer electrolyte according to claim 1, wherein the metal ions are iron (Fe) ions.

4. The solid polymer electrolyte according to claim 1, wherein the perfluorinated electrolyte is perfluorocarbon sulfonic acid.

5. The solid polymer electrolyte according to claim 3, wherein the perfluorinated electrolyte is perfluorocarbon sulfonic acid.

6. A solid polymer fuel cell using the solid polymer electrolyte according to claim 4.

7. A solid polymer fuel cell using the solid polymer electrolyte according to claim 5.

* * * * *